(12) United States Patent
Mielenz

(10) Patent No.: US 11,541,887 B2
(45) Date of Patent: Jan. 3, 2023

(54) ENABLING REVERSE MOTION OF A PRECEDING VEHICLE AT BUNCHED TRAFFIC SITES

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

(*) Notice: Subject to any disclaimer, the term of this patent is extended or adjusted under 35 U.S.C. 154(b) by 394 days.

(21) Appl. No.: 16/814,363

(22) Filed: Mar. 10, 2020

(65) Prior Publication Data

US 2020/0290614 A1  Sep. 17, 2020

(30) Foreign Application Priority Data

Mar. 13, 2019  (DE) .................... 10 2019 203 371.7
Jan. 28, 2020  (DE) .................... 10 2020 200 968.6

(51) Int. Cl.
  *B60W 30/16*  (2020.01)
  *B60W 30/09*  (2012.01)

(52) U.S. Cl.
  CPC ............ *B60W 30/16* (2013.01); *B60W 30/09* (2013.01)

(58) Field of Classification Search
  CPC ............................. B60W 30/16; B60W 30/09
  USPC .......................................................... 701/23
  See application file for complete search history.

(56) References Cited

U.S. PATENT DOCUMENTS

| | | | |
|---|---|---|---|
| 8,761,991 B1* | 6/2014 | Ferguson | G08G 1/09623 701/28 |
| 9,074,536 B2* | 7/2015 | Schwindt | B60W 30/16 |
| 2013/0226431 A1* | 8/2013 | Lu | B60W 30/16 701/96 |

FOREIGN PATENT DOCUMENTS

| | | |
|---|---|---|
| DE | 10 2004 047 081 A1 | 4/2006 |
| DE | 10 2014 220 685 A1 | 4/2016 |
| DE | 10 2017 213 621 A1 | 2/2019 |

\* cited by examiner

*Primary Examiner* — Peter D Nolan
*Assistant Examiner* — Luke Huynh
(74) *Attorney, Agent, or Firm* — Maginot, Moore & Beck LLP

(57) ABSTRACT

A method for adjusting a safety distance between a first vehicle and a second vehicle preceding the first vehicle at a bunched traffic site by at least one control device is disclosed which includes receiving measurement data of at least one sensor unit with the at least one control device. The method includes evaluating the measurement data of the at least one sensor unit with the at least one control device to identify a bunched traffic site in front of the second vehicle and identifying a safety distance of the first vehicle from the second vehicle, wherein the identified safety distance accounts for a possible reverse motion of the second vehicle. The method further includes establishing the identified safety distance with the at least one control device based upon the identified bunched traffic site. A control device, a computer program and a machine-readable storage medium are further disclosed.

20 Claims, 3 Drawing Sheets

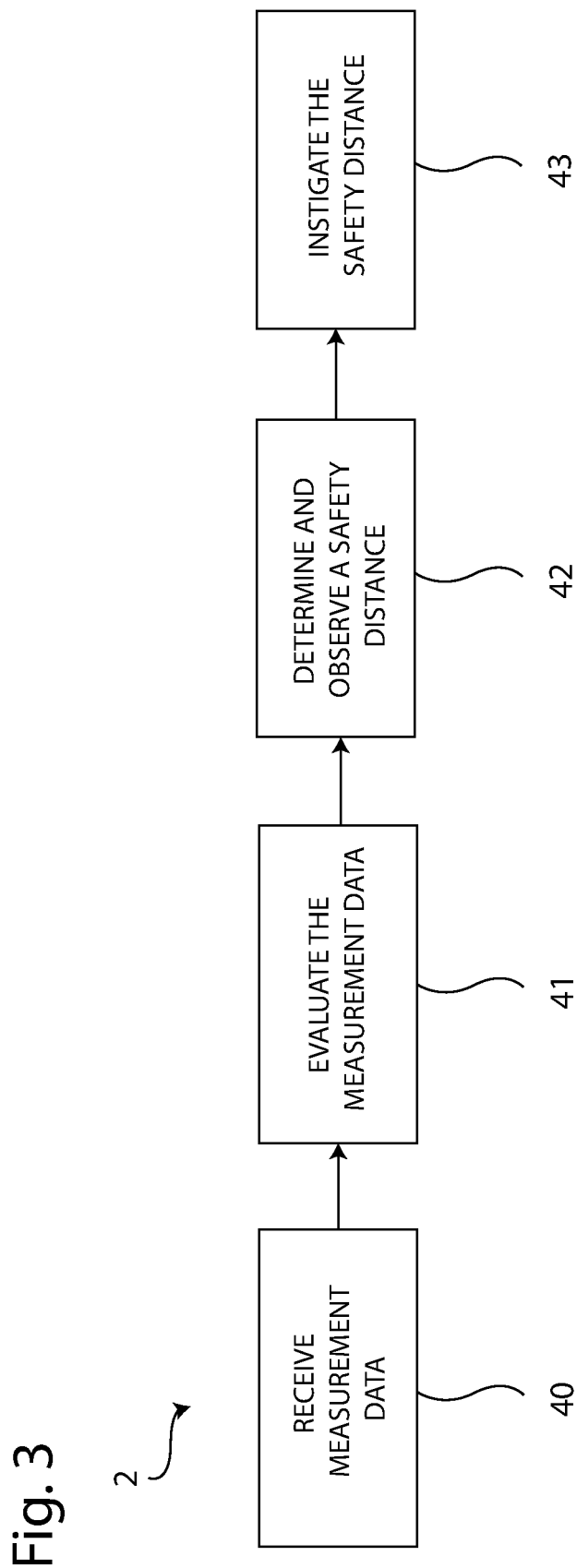

ENABLING REVERSE MOTION OF A PRECEDING VEHICLE AT BUNCHED TRAFFIC SITES

This application claims priority under 35 U.S.C. § 119 to patent application no. 10 2019 203 371.7 filed on Mar. 13, 2019 in Germany, and to patent application no. 10 2020 200 968.6 filed on Jan. 28, 2020 in Germany, the disclosures of which are incorporated herein by reference in their entirety.

The present disclosure relates to a method for adjusting a distance between a first vehicle and a second vehicle preceding the first vehicle, in particular at a bunched traffic site. The present disclosure further relates to a control device, a computer program and to a machine-readable storage medium.

BACKGROUND

Various methods for the automated operation of vehicles are already known. In particular, in such methods, the longitudinal and transverse guidance of the vehicles is controlled in such a way that the distance from preceding vehicles is adjusted in a manner that is optimized for the speed. The regulation of the safety distance of a vehicle from a preceding vehicle can take place according to defined convenience conditions, traffic events, lane markings and light signals.

At bunched traffic sites such as, for example, intersections or exits, it may be that there is only a limited overview of the traffic events. Parked vehicles or static objects can, for example, impair the view. In such traffic situations, a vehicle must venture carefully into a road with impaired view. Depending on the particular situation, it may be necessary to reverse the vehicle here. In such traffic situations, usual automatically operated vehicles can maintain an insufficient safety distance from the preceding vehicle, and thus prevent reverse motion of the preceding vehicle.

SUMMARY

The object underlying the disclosure can be seen in proposing a method and a control device that enable a preceding vehicle to reverse at bunched traffic sites with a poor overview.

According to one aspect of the disclosure, a method is provided for adjusting a distance between a first vehicle and a second vehicle preceding the first vehicle. In particular the method for adjusting a safety distance at a bunched traffic site can be carried out by a control device.

In one step, measurement data of at least one sensor unit are received by the control device. The measurement data can here be made available by a sensor unit of the first vehicle, of the second vehicle, of other traffic participants, of infrastructure units and the like.

The measurement data of the sensor unit are evaluated to ascertain a bunched traffic site in front of the second vehicle. The measurement data of the sensor unit can in particular be checked from the point of view of a presence of a bunched traffic site. In the event of an upcoming bunched traffic site being recognized, a safety distance of the first vehicle from the second vehicle is ascertained, and observance of the ascertained safety distance is instigated by the control device.

The safety distance of the first vehicle from the second vehicle is preferably maintained for a possible reverse motion of the second vehicle. Reverse motion of the second vehicle at traffic regions with poor overview is thus enabled, and the safety of such situations is increased.

According to a further aspect of the disclosure, a control device is provided, wherein the control device is configured to carry out the method. The control device can preferably be a control device internal to the vehicle. The control device can also be implemented as a component or module of a vehicle controller for automated driving. Alternatively or in addition, the control device can be configured as a server unit or cloud external to the vehicle that can receive and evaluate the measurement data of the at least one sensor unit over a wireless communication link.

According to one aspect of the disclosure, moreover, a computer program is provided comprising commands which, when the computer program is executed by a control device, cause this to execute the method. According to a further aspect of the disclosure, a machine-readable storage medium is provided on which the computer program is stored.

The first vehicle can, preferably, in accordance with the BASt (Federal Highways Research Institute) definition, be operable in an assisted manner, partially automated, highly automated and/or fully automated or driverless. The vehicle can comprise a vehicle controller for this purpose which can access the surroundings sensor system and the actuators for steering, accelerating and braking the first vehicle.

The first vehicle can, in particular, be designed as a passenger motor vehicle, a truck, a personnel transport vehicle such as, for example, a taxi or bus, a commercial vehicle, an agricultural vehicle and the like.

The at least one sensor unit can, for example, be a camera sensor, radar sensor, lidar sensor, GPS sensor and the like.

The bunched traffic site can, in particular, be configured as a traffic region with poor overview.

The bunched traffic site can be a traffic region at which a traffic participant only has a limited view of a traffic lane. Due to the restricted view of the upcoming traffic lane, the respective traffic participant must carefully "edge their way forward" into the traffic lane in order to minimize a risk of accident. A bunched traffic site can, for example, be an intersection, a T-junction, an exit, a roundabout, a car park, a parking garage, and the like.

The method according to the disclosure and the control device enable an automatically operable vehicle, in particular the first vehicle, while driving behind a preceding driver or the second vehicle, to decide whether a larger distance from the second vehicle is admitted at a bunched traffic site.

If a bunched traffic site is detected as a result of evaluating the measurement data, then a safety distance from the preceding second vehicle can be adjusted. In particular, an access to the actuators and the vehicle controller by the control device can be enabled, in order to realize an early braking of the first vehicle before the second vehicle.

The safety distance can preferably be dimensioned such that a potential reverse motion of the second vehicle is possible. If a traffic situation or a traffic region with poor overview is not ascertained through evaluation of the measurement data of the at least one sensor unit, then the distance of the first vehicle from the preceding second vehicle can be closed.

Rear-end collisions and deadlock situations can furthermore be avoided by the method and the control device. It is further possible to prevent the first vehicle from driving too close up to a preceding vehicle and preventing the preceding vehicle from reversing at traffic sections with poor overview.

According to a further form of embodiment, measurement data of at least one sensor unit of the first and/or the second vehicle is used for the ascertainment of the bunched traffic site. The control device can in this way obtain access to the surroundings sensor system of the second vehicle, whereby the "range of vision" of the surroundings sensor system of the first vehicle is enlarged. Preferably the vehicles can be coupled for data transfer by means of a wireless communication link, and thus enable an exchange of the measurement data.

According to a further exemplary embodiment, measurement data of at least one sensor unit of at least one third vehicle and/or of an infrastructure unit is used for the ascertainment of the bunched traffic site. The range of vision or the sampling range of the surroundings sensor system can be enlarged in this way. Traffic sections with poor overview can thus be recognized earlier. The measurement data can be exchanged between the traffic participants directly or indirectly via an external server unit or cloud. A car-to-car, car-to-infrastructure, mobile telephony or a WLAN communication link can, for example, be used for exchange of the measurement data.

Bunched traffic sites can, furthermore, not only be recognized, but existing bunched traffic sites can be updated more quickly if the traffic situation has changed. The traffic situation can, for example, change when parked vehicles begin to operate and are removed from the bunched traffic site, whereby the visibility at the bunched traffic site rises.

According to a further exemplary embodiment, parking vehicles and/or static objects are ascertained in the recognition of the bunched traffic site. Parked or parking vehicles that limit the view of the traffic lanes of the bunched traffic site can, for example, be ascertained. Containers, building sites, persons and the like can also impair the visibility at such bunched traffic sites. These factors can serve as indicators for a traffic situation with poor overview, and thus cause the control device to maintain a safety range from the first vehicle to the preceding second vehicle.

According to a further exemplary embodiment, the ascertained measurement data of the at least one sensor unit is transmitted to an external server unit for the establishment of a bunched traffic site, and made available to be called up by other traffic participants. A central collection point for the ascertained measurement data can be made available in this way. The server unit can, for example, be designed as a cloud. The measurement data received by the server unit can be stored and/or evaluated analogously to the control device. The server unit can, in particular, prepare a map with traffic regions of poor overview on the basis of the measurement data, and make it available to the traffic participants.

Alternatively or in addition, traffic regions of poor overview that have already been ascertained or established can be transmitted to the server unit, for example by control devices of vehicles. The server unit can, for example, note the transmitted positions or regions on a map.

According to a further exemplary embodiment, map data is used for the ascertainment of the bunched traffic site. The map data can be received and evaluated by the control unit here. The control device can, in particular, along a planned trajectory of the first vehicle, examine the trajectory in advance with regard to traffic regions with poor overview, and mark them.

Depending on the vehicle position of the first vehicle, a safety distance can then be maintained automatically at such traffic regions. The control device can receive the measurement data of one or a plurality of position sensors of the first vehicle for this purpose.

According to a further form of embodiment, the safety distance is ascertained on the basis of dimensions of the second vehicle. Through this measure the first vehicle can allow the second vehicle to reverse. The safety distance is preferably dimensioned in such a way that the second vehicle can drive fully into the safety distance.

According to a further form of embodiment, a length of the safety distance that corresponds to a length of the second vehicle is ascertained. Such a safety distance can be technically implemented in a particularly simple manner. A vehicle length of the preceding vehicle is ascertained and/or received via a communication link between the vehicles for this purpose. Such a safety distance is fundamentally sufficient for most traffic situations. Further calculations by the control device can be omitted as a result. The safety distance can preferably be greater than the length of the second vehicle, in order to provide sufficient reserves for a reverse motion of the preceding vehicle.

According to a further alternative or additional form of embodiment, a region of a traffic lane of the third vehicle at the bunched traffic site is blocked by the second vehicle. The safety distance is ascertained on the basis of a dimensional measurement of the blocked region. The necessary distance or safety distance between the vehicles can be ascertained precisely in this way. In particular, a length with which the second vehicle intrudes into a traffic lane of the third vehicle can be measured for this purpose. A traffic lane width of the blocked traffic lane can, furthermore, be taken into account as the length of the safety distance.

According to a further form of embodiment, the length of the safety distance that corresponds to at least a length of the blocked region is ascertained. A tolerance region or a safety distance can here be added to the ascertained length of the blocked region. The second vehicle can reverse at most through this length in order to fully clear the traffic lane.

The length of the blocked region can, in particular, be measured when the preceding second vehicle attempts to turn at an angle into the traffic lane, and is thus visible at the side for the surroundings sensor system of the first vehicle. An unnecessarily large safety distance between the vehicles can be avoided in this way. The safety distance can here comprise an additional tolerance range that enlarges the safety distance. The tolerance range can, for example, be one or several centimeters or meters.

The length of the blocked region can, moreover, be ascertained through the reception of tracking data of the second vehicle and through tracking the position of the second vehicle on a digital map. The dimensions of the second vehicle can, here, be used for a particularly precise estimation of the length of the blocked region.

As a further possibility for the ascertainment of the length of the blocked region, data can be received via a Car2Car communication link, for example between the second vehicle and the first vehicle. The second vehicle can, for example, inform the first vehicle of its position and dimensions, whereby the control device of the second vehicle can calculate the length of the blocked region. Alternatively or in addition, data can be received from a third vehicle. Measurement data of a surroundings sensor system of the third vehicle that detect the second vehicle can here be received by the first vehicle. The length of the blocked region can then be ascertained with reference to the received measurement data.

Analogously to the ascertainment of the length of the blocked region on the basis of data that has been transmitted over a Car2Car communication link, the length of the blocked region can also be determined by means of data from infrastructure units. The first vehicle can establish a car-2-X communication link for this purpose to one or a plurality of infrastructure units that provide surroundings measurement data. From the measurement data provided, the control device can determine the length along which the second vehicle intrudes, for example, into transverse traffic.

According to a further form of embodiment, a safety distance of the first vehicle from the second vehicle is defined, and, if an upcoming bunched traffic site is detected, observance of the defined safety distance instigated by the control device. The safety distance can thus be statically specified in advance. A calculation or measurement of the required safety distance can thus be omitted. Through this measure the safety distance can be adjusted in a particularly simple technical manner.

According to a further exemplary embodiment, at least one safety distance is defined depending on a driving situation of the first vehicle, whereby in addition to an upcoming bunched traffic site, a driving situation, in particular a region of the bunched traffic site, is ascertained and observance of the predefined safety distance instigated by the control device. One or a plurality of static safety distances can hereby be specified in advance. Safety distances can be assigned to different driving situations. For example, a smaller safety distance can be specified in an urban region than in a rural region. A larger safety distance can, moreover, be provided at level crossings in comparison to traffic lights or an intersection.

The driving situation can take the form of a type of bunched traffic site such as, for example, an intersection, level crossing, T-junction, exit or building site and/or as a surrounding, such as for example an urban region or a non-urban region.

BRIEF DESCRIPTION OF THE DRAWINGS

Preferred exemplary embodiments of the disclosure are explained in more detail below with reference to highly simplified schematic illustrations. Here FIG. 3 shows a schematic flow diagram of the method according to one form of embodiment.

DETAILED DESCRIPTION

Figure 1:
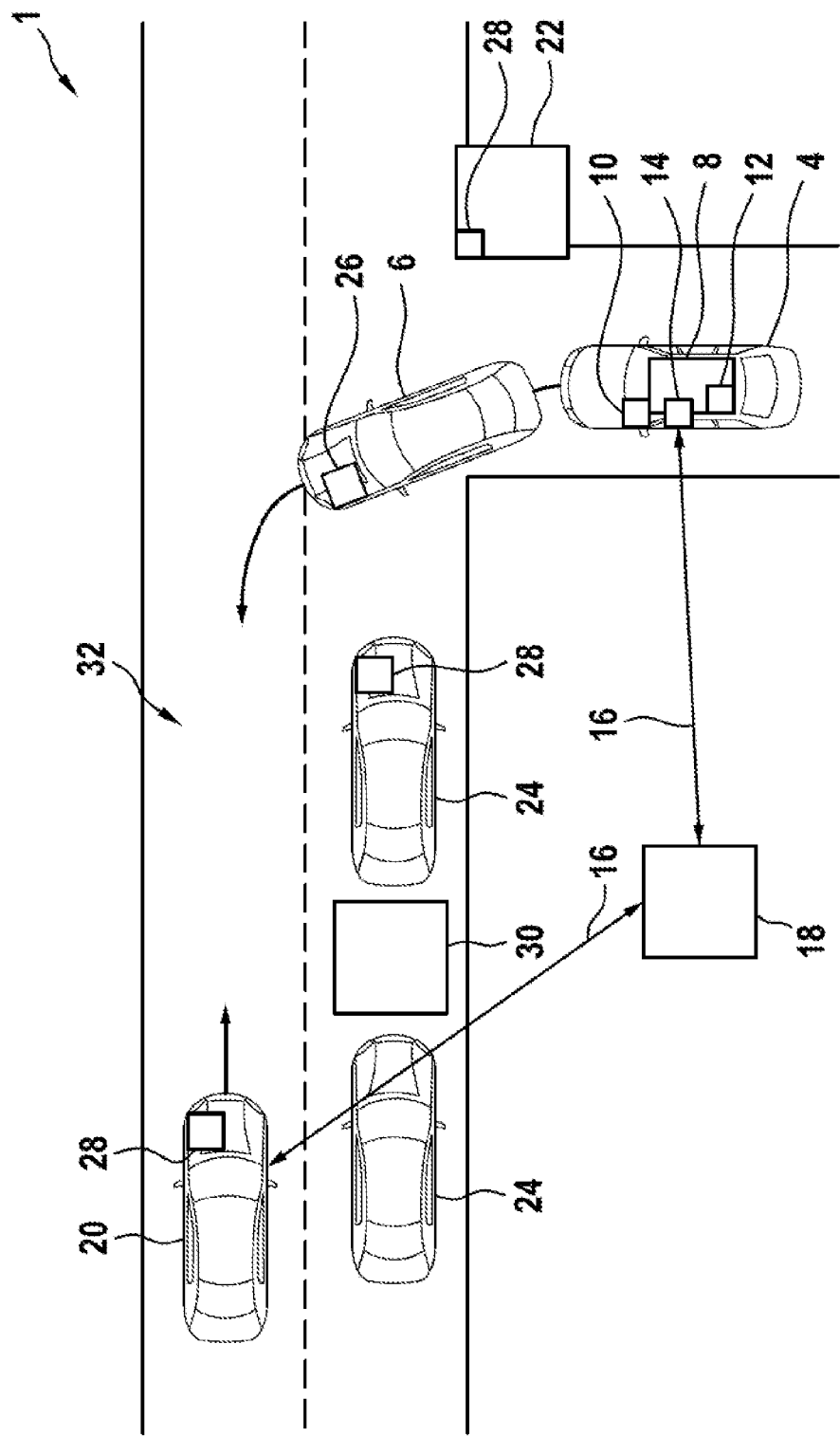
FIG. 1 shows a schematic plan view of a bunched traffic site to illustrate a method according to one form of embodiment.

A schematic plan view of a bunched traffic site 1 is illustrated in FIG. 1 to illustrate a method 2 according to one form of embodiment. The bunched traffic site 1 is, by way of example, configured as a traffic region of a T-junction with poor overview.

A first vehicle 4 follows a second vehicle 6. The first vehicle 4 is, for example, configured as a vehicle that can be operated automatically in accordance with the BASt definition, and is in a fully automatic operating mode.

The first vehicle 4 comprises a control device 8 that receives and evaluates measurement data from a surroundings sensor system. The surroundings sensor system 10 is here used in simplified form for one or a plurality of sensor units which can, for example, comprise camera sensors, lidar sensors, radar sensors, GNSS sensors and the like.

The control device 8 is connected to a machine-readable storage medium 12 on which one or a plurality of computer programs are stored which can be executed by the control device 8 in order, for example, to carry out the method 2.

The control device 8 is furthermore connected to a communication unit 14 that serves to establish a communication link 16 to an external server unit 18.

The server unit 18 serves to receive measurement data and to provide bunched traffic sites with poor overview that have been ascertained. The bunched traffic sites with poor overview can, in particular, be made available to other traffic participants such as, for example, a third vehicle 20.

The arrows illustrate by way of example the communication links 16 and the data exchange between the vehicles.

To extend the sampling region of the first vehicle 4, measurement data of the second vehicle 6, of the at least one third vehicle 20, of an infrastructure unit 22 and of parked vehicles 24 can be taken into account in the evaluation. The second vehicle 6 and the third vehicle 20 can also, for example, comprise sensor units 26, 28 for this purpose.

Parked vehicles 24 and static objects 30 such as, for example, building sites or containers can be ascertained with the aid of the sensors 10, 26, 28 and employed for an assessment of the traffic situation by the control device 8 and/or the server unit 18.

According to the exemplary embodiment, the second vehicle 6 turns into a traffic lane 32 in which the view is obstructed. The view of the traffic lane 32 is restricted by parked vehicles 24 and a static object 30. The driver of the second vehicle 6 can therefore not recognize the third vehicle 20 at an early stage. The arrows illustrate the anticipated trajectories of the vehicles 6, 20.

The driver of the second vehicle 6 edges forward carefully into the traffic lane 32, and can, for example, be too late to recognize the third vehicle 20. It may be necessary for the second vehicle 6 to reverse in order to avoid a traffic jam.

Figure 2:
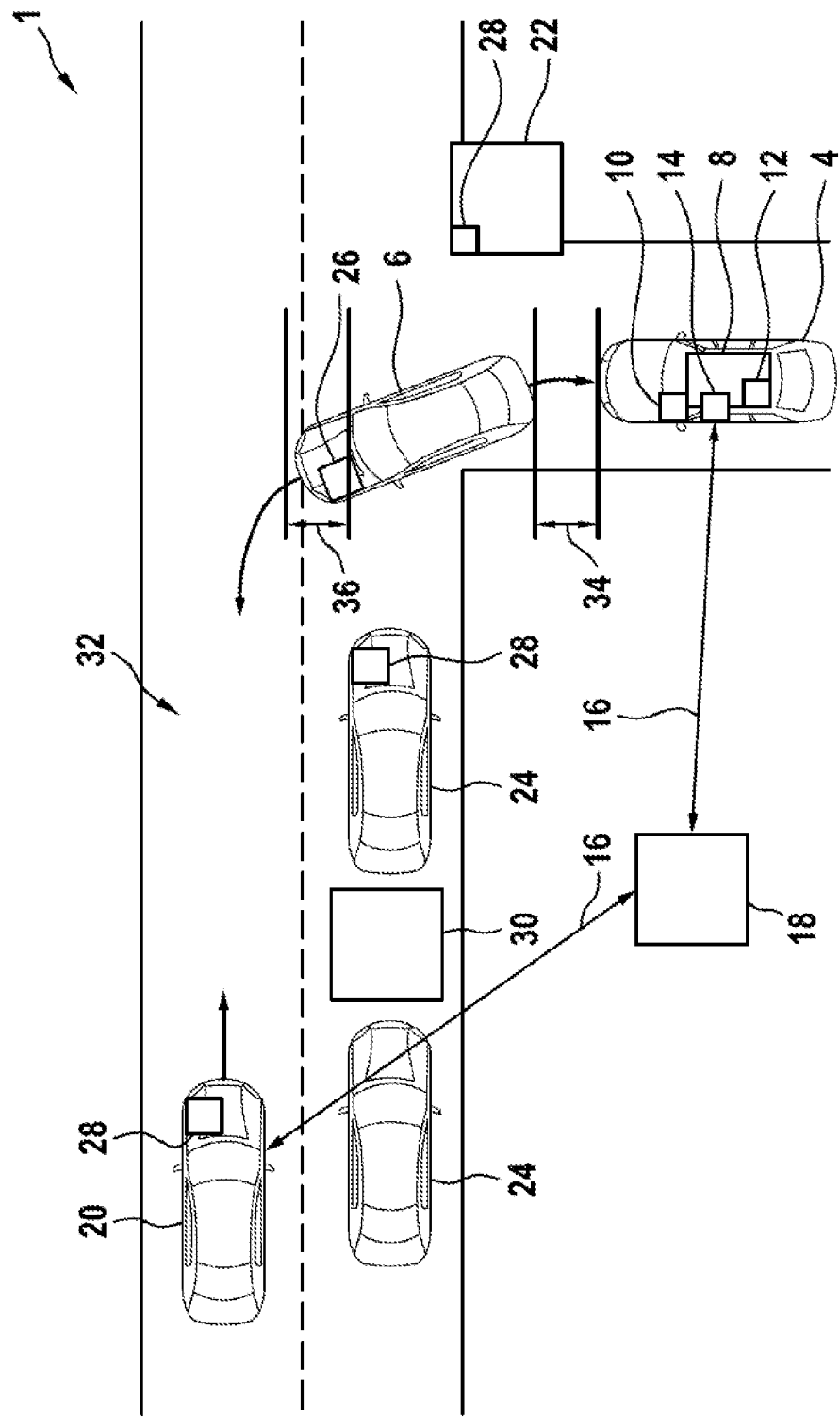
FIG. 2 shows a schematic plan view of a bunched traffic site to illustrate the method according to the form of embodiment.

FIG. 2 shows a schematic plan view of a bunched traffic site 1 to illustrate the method 2 according to the form of embodiment. The way in which the first vehicle 4 sets up a safety distance 34 after a recognition of a traffic region 1 with a poor view is illustrated here in particular.

An adequate safety distance can refer here to that distance that the driver of the second vehicle 6 in front must reverse in order to clear the relevant traffic lane 32 again. As an alternative, this distance can also be chosen such that the driver of the second vehicle 6 in front again also fits fully into the safety distance 34.

According to the exemplary embodiment, a safety distance 34 is ascertained having a length that corresponds to a length of a blocked region 36 on the traffic lane 32.

FIG. 3 illustrates a schematic flow diagram of the method 2 according to one form of embodiment. The method 2 serves to adjust a safety distance 34 between a first vehicle 4 and the preceding second vehicle 6 inasmuch as the traffic situation requires this. Such a traffic situation or a traffic region is preferably present when the visibility of the traffic lane 32 that is to be driven is restricted. In such traffic regions at least one traffic lane 32 can also be only usable in a restricted manner as a result of parked vehicles 24 or static objects 30.

In a step 40, measurement data from at least one sensor unit 10, 26, 28 of the first vehicle 4 or of at least one of the other traffic participants 6, 20, 22 are received by the control device 8. Alternatively or in addition, the measurement data can also be received from the server unit 18.

Through evaluating 41 the measurement data of the at least one sensor unit 10, 26, 28, a bunched traffic site 1 is recognized in front of the second vehicle 6. The measurement data of the sensor units 10, 26, 28 can in particular be checked from the point of view of a presence of a bunched traffic site. The checking of the measurement data can take place continuously or at defined temporal intervals.

In the event of an upcoming bunched traffic site 1 being recognized, a safety distance 34 of the first vehicle 4 from the second vehicle 6 is ascertained, and an observance 42 of the ascertained safety distance 34 is instigated 43 by the control device 8.

What is claimed is:

1. A method for adjusting a safety distance between a first vehicle and a second vehicle preceding the first vehicle at a bunched traffic site by at least one control device, comprising:
    receiving measurement data of at least one sensor unit with the at least one control device;
    evaluating the measurement data of the at least one sensor unit with the at least one control device to identify a bunched traffic site in front of the second vehicle;
    identifying a safety distance of the first vehicle from the second vehicle, wherein the identified safety distance accounts for a possible reverse motion of the second vehicle;
    establishing the identified safety distance with the at least one control device based upon the identified bunched traffic site; and
    operating the first vehicle to position the first vehicle the established safety distance from the second vehicle at the bunched traffic site.

2. The method according to claim 1, wherein the received measurement data is measurement data of at least one sensor unit of at least one of the first vehicle and the second vehicle.

3. The method according to claim 1, wherein the received measurement data is measurement data of at least one sensor unit of at least one of a third vehicle and an infrastructure unit.

4. The method according to claim 1, wherein the identification of the bunched traffic site is based upon identification of at least one of parking vehicles and static objects.

5. The method according to claim 1, wherein the at least one control device includes an external server, the method further comprising:
    transmitting the measurement data of the at least one sensor unit to the external server unit; and
    transmitting data associated with the identified bunched traffic site using the external server.

6. The method according to claim 1, wherein map data is used in the identification of the bunched traffic site.

7. The method according to claim 1, wherein the identified safety distance is identified based on at least one dimension of the second vehicle.

8. The method according to claim 7, wherein the identified safety distance corresponds to at least a length of the second vehicle.

9. The method according to claim 1, wherein the identified safety distance is identified based on a length of a blocked region when a region of a traffic lane of a third vehicle is blocked at the bunched traffic site by the second vehicle.

10. The method according to claim 9, wherein the identified safety distance is at least the length of the blocked region.

11. The method according to claim 1, wherein:
    the identified safety distance of the first vehicle from the second vehicle is predefined.

12. The method according to claim 11, the method further comprising:
    predefining at least one further safety distance for a predefined driving situation of the first vehicle;
    identifying that the first vehicle is in the predefined driving situation; and
    establishing the predefined at least one further safety distance with the at least one control device based upon the identified predefined driving situation.

13. A vehicle control system, for adjusting a safety distance between a first vehicle and a second vehicle preceding the first vehicle at a bunched traffic site, comprising:
    a machine-readable storage medium on which command instructions are stored; and
    at least one control device operably connected to the machine-readable storage and configured to execute the command instructions to:
        receive measurement data of at least one sensor unit,
        evaluate the measurement data of the at least one sensor unit to identify a bunched traffic site in front of the first vehicle,
        identify a safety distance of the first vehicle from the second vehicle, wherein the identified safety distance accounts for a possible reverse motion of the second vehicle,
        establish the identified safety distance based upon the identified bunched traffic site, and
        operate the first vehicle to position the first vehicle the established safety distance from the second vehicle at the bunched traffic site.

14. The system according to claim 13, wherein the at least one control device is configured to execute the command instructions to receive the measurement data from at least one sensor unit of at least one of the first vehicle and the second vehicle.

15. The system according to claim 13, wherein the at least one control device is configured to execute the command instructions to receive the measurement data from at least one of a third vehicle and an infrastructure unit.

16. The system according to claim 13, wherein the at least one control device is configured to execute the command instructions to identify a bunched traffic site in front of the first vehicle based upon identification of at least one of parking vehicles and static objects.

17. The system according to claim 13, wherein the at least one control device includes an external server, the external server configured to execute the command instructions to:
    transmit data associated with the identified bunched traffic site to the first vehicle.

18. The system according to claim 13, wherein the at least one control device is configured to execute the command instructions to identify a bunched traffic site in front of the first vehicle based upon map data.

19. The system according to claim 13, wherein the at least one control device is configured to execute the command instructions to identify the safety distance based on at least one dimension of the second vehicle.

20. The system according to claim 13, wherein the at least one control device is configured to execute the command instructions to identify the safety distance based on a length of a blocked region when a region of a traffic lane of a third vehicle is blocked at the bunched traffic site by the second vehicle.

* * * * *